United States Patent [19]
Kaneko

[11] Patent Number: 4,795,010
[45] Date of Patent: Jan. 3, 1989

[54] HYDRAULIC DAMPER

[75] Inventor: Shinji Kaneko, Kanagawa, Japan

[73] Assignee: Tokico Ltd., Kanagawa, Japan

[21] Appl. No.: 35,723

[22] Filed: Apr. 8, 1987

[30] Foreign Application Priority Data

Apr. 10, 1986 [JP] Japan .............................. 61-53758[U]
Apr. 12, 1986 [JP] Japan .............................. 61-55027[U]

[51] Int. Cl.$^4$ ............................................. F16F 9/00
[52] U.S. Cl. ......................... 188/322.19; 188/322.11; 188/322.22
[58] Field of Search ...................... 188/322.19, 322.18, 188/322.11, 322.22, 315; 425/809; 403/274, 284

[56] References Cited

U.S. PATENT DOCUMENTS

| 2,752,059 | 6/1956 | Schneider | 425/809 |
| 3,837,445 | 9/1974 | Pierle | 188/322.15 |
| 3,896,908 | 7/1975 | Petrak | 188/322.15 |

FOREIGN PATENT DOCUMENTS

| 1224765 | 7/1960 | France | 188/322.15 |
| 2093157 | 8/1982 | United Kingdom | 188/322.11 |

Primary Examiner—Andres Kashnikow
Assistant Examiner—Mark T. Le
Attorney, Agent, or Firm—Wenderoth, Lind & Ponack

[57] ABSTRACT

A hydraulic damper for use in a suspension device of a vehicle such as an automobile includes a main body forming a cylinder, a packing cap fitted on and fixedly secured to one end of the main body, a piston rod connected to a piston movably received in the cylinder and extending through the packing cap to the outside of the cylinder, a spring seat mounted on the outer periphery of the main body for receiving and supporting one end of a suspension spring, and a bump stop mounted on the packing cap for abutting a bump rubber mounted on the chassis of the vehicle and intended to bump against the damper when the damper is contracted. The bump stop includes a bump cap fitted on and fixedly secured to the packing cap, a bump plate for directly abutting the bump rubber and a plate cap formed to be integral with the bump plate and adapted to be fitted on and hooked to the bump cap, thereby preventing the plate cap from coming off the bump cap.

11 Claims, 4 Drawing Sheets

HYDRAULIC DAMPER

BACKGROUND OF THE INVENTION

The present invention relates to a hydraulic damper for use in a vehicle such as an automobile, and more particularly relates to a hydraulic damper which is provided with a bump stopper.

A hydraulic damper provided with a spring seat and a bump stopper is known in the field as a hydraulic damper that may be used in the front suspension of a vehicle. The spring seat is adapted to support the lower end of a suspension spring. It is necessary to prevent the chassis of the vehicle from directly colliding with the upper end portion of the hydraulic damper to prevent damage thereto when the damper is contracted during running of the vehicle. To this end, a bump rubber is mounted on the chassis of the vehicle and a bump stopper is mounted on the upper end of the hydraulic damper. The bump rubber is stopped and compressed by the bump stopper and is deformed when the hydraulic damper is contracted, so that the bump rubber absorb the impact energy and the hydraulic damper can thus be prevented from being damaged.

Shown in FIG. 1 is an example of such type of hydraulic damper. An outer tube 102 of a cylinder of a hydraulic damper 101 is provided with a plurality of projecting portions 106 including first and second stepped portions 106a and 106b, respectively. A spring seat 107 is secured to the outer tube 102 with an inner diameter portion 107a of the spring seat 107 being press-fitted on the first stepped portion 106a of the outer tube 106 and with a lower stepped portion 107b of the spring seat 107 being engaged with the second stepped portion 106b of the outer tube 106. A packing cap 103 is secured to the upper end of the outer tube 102 by welding and a bump cap 104, in turn, is welded on the packing cap 103. A plate cap 108 provided with a bump plate 105 welded thereon is press-fitted on the outer periphery of the bump cap 104. Thus, a bump stopper 110, which consists of the bump cap 104, plate cap 108 and bump plate 105, is secured to the upper end of the outer tube 102. Numeral 109 designates a piston rod which is connected to a piston (not shown) movably received in the cylinder and which extends to the outside of the cylinder.

With such a conventional hydraulic damper, it is very difficult for the spring seat 107 to be fixedly secured to the outer tube 102 by such means as welding in an automatic assembly line because of its large dimensions. Therefore, the spring seat 107 is, press-fitted on the outer tube 102 after the assembly of the other parts has been completed. On the other hand, as described above, a bump rubber (not shown) mounted on the chassis of a vehicle (not shown) is stopped or abutted and compressed by the bump stopper 110 so as to be deformed radially of the bump plate 105 when the hydraulic damper 101 is contracted. If the bump rubber is deformed beyond the outer periphery of the bump plate 105, the bump rubber pressed by the chassis from the above is subjected to shearing force by the edge of the outer periphery of the bump plate 105. With such shearing force being applied repeatedly, the bump rubber gradually deteriorates. To avoid this problem, it is necessary for the bump plate 105 to have a large area so that the bump rubber is not deformed beyond the outer periphery of the bump plate 105 when it is compressed. Therefore, the outside diameter of the bump plate 105 is usually made larger than the outside diameter of the outer tube 102 or the inside diameter of the spring seat 107. In an assembly operation, therefore, assembly of other parts is completed first, the spring seat 107 is next press-fitted on the outer tube 102 and the plate cap 108 is finally press-fitted on the bump cap 104.

In such a conventional hydraulic damper, the plate cap 108 provided with the bump plate 105 welded thereon is merely press-fitted on the bump cap 104, so that only the frictional resistance generated between the bump cap 104 and the plate cap 108 acts to prevent the plate cap 108 from being upwardly disengaged from the bump cap 104. This frictional resistance is not necessarily sufficient for completely preventing such disengagement and it is possible that the plate cap 108 may come out of engagement with the bump cap 104 as a result of vibration or shock applied to the damper during transportation of the damper or of poor treatment of the damper.

SUMMARY OF THE INVENTION

The present invention has been accomplished to solve the aforementioned problems and provides a hydraulic damper for use in a suspension device for a vehicle such as an automobile that includes a main body which forms a cylinder, a packing cap fitted on and fixedly secured to one end of the main body, a piston rod connected to a piston movably received in the cylinder and extending through the packing cap to the outside of the cylinder, a spring seat mounted on the main body for receiving and supporting one end of a suspension spring, and a bump stop mounted on the packing cap for stopping or abutting a bump rubber mounted on the chassis of the vehicle and intended to bump against the damper when the damper is contracted, said bump stop comprising a bump cap fitted on and fixedly secured to the packing cap, a bump plate for directly stopping or abutting the bump rubber and a plate cap formed integrally with the bump plate and adapted to be fitted on and hooked to the bump cap such that the plate cap is prevented from coming off the bump cap.

In a preferred embodiment of the invention, the spring seat is provided with a tubular portion for fitting on the outer periphery of the main body and the damper further includes stop means for preventing the spring seat from being displaced axially of the main body.

BRIEF DESCRIPTION OF THE DRAWINGS

Further objects and advantages of the invention will become apparent from the following detailed description taken with reference to the accompanying drawings, in which.

DETAILED DESCRIPTION OF THE PREFERRED EMBODIMENTS

Figure 2:
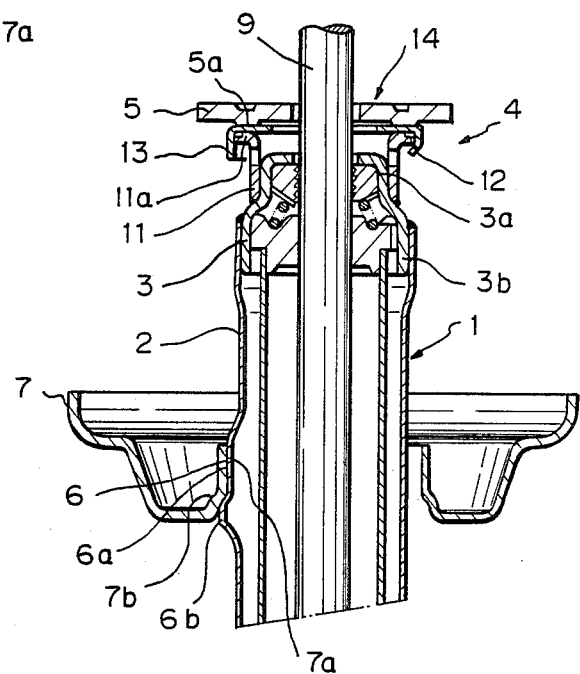
FIG. 2 is a partially broken sectional view showing a first embodiment of the invention.
Figure 3:
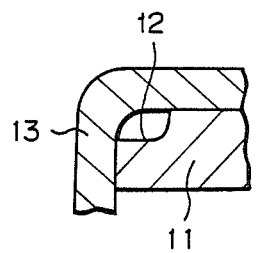
FIG. 3 is an enlarged view of a portion of a bump cap and a plate cap as shown in FIG. 2.

Referring to FIGS. 2 and 3, a first embodiment according to the present invention will initially be explained.

Shown at 1 is a hydraulic damper according to the first embodiment. The hydraulic damper 1 includes a main tube or body 2, the outer wall of which protrudes to form three projecting portions 6 which are equally spaced from each other in the circumferential direction.

A packing cap 3 is fixedly secured to an upper end of the main body 2 by such means as welding. The packing cap 3 includes an upper small diameter portion 3a and a lower large diameter portion 3b. A bump cap 11 is fitted on the small diameter portion 3a of the packing cap 3, with the lower end of the bump cap 11 being welded to the packing cap 3.

The bump cap 11 is in the shape of a tube and includes a flange 11a which extends radially outwardly. As best shown in FIG. 3, a recess or sunk portion 12 is formed on the circumference of the upper surface of the flange 11a and extends around the entire circumference. The outer diameter of the flange 11a is smaller than the inner diameter of a spring seat 7 and thus the spring seat 7 can be fitted on the main body 2 in an assembling operation.

Shown at 5 is a bump plate. The bump plate 5 includes a plurality of small projections 5a for projection welding formed on the lower surface thereof and is made integral with a cap-shaped plate cap 13 with the small projections 5a being welded to the upper surface of the plate cap 13 by means of projection welding. The bump plate 5 and the plate cap 13 constitute a bump plate assembly 14. The inner diameter of the plate cap 13 is of such a size that the plate cap may be closely fitted on the circumference of the flange 11a of the bump cap 11.

In assembling the hydraulic damper 1, after the spring seat 7 is fixed to the main body 2, the plate cap 13 is lightly press-fitted to the flange 11a of the bump cap 11 and then the lower end portion of the plate cap 13 is radially inwardly deformed at three or four circumferentially equally spaced positions or around the entire circumference to thereby fixedly secure the plate cap 13 to the bump cap 11. Thus, a bump stop 4 which consists of the bump cap 11, plate cap 13 and bump plate 5 is fixedly secured to the upper end of the main body 2.

As best shown in FIG. 3 and described above, the sunk portion 12 is formed on the circumference of the upper surface of the bump cap 11. Therefore, interference between the upper edge portion of the bump cap 11 and the bottom corner portion of the plate cap 13 is eliminated. As a result, the inner circumferential surface of the plate cap 13 can be intimately engaged with the outer circumferential surface of the flange 11a of the bump cap 11, so that the plate cap 13 can be stably fitted on and secured to the flange 11a.

As described above, a bump rubber (not shown) mounted on the chassis of a vehicle (not shown) is stopped or abutted and compressed by the bump stop 4 to be deformed radially of the bump plate 5 when the hydraulic damper 1 is contracted. If the bump rubber is deformed beyond the outer periphery of the bump plate 5, the bump rubber pressed by the chassis from above is subjected to shearing force by the edge of the outer periphery of the bump plate 5. With such shearing force being applied repeatedly, the bump rubber gradually deteriorates. To avoid this problem, the bump plate 5 according to this embodiment is also formed with a large area so that the bump rubber is not deformed beyond the outer periphery of the plate 5 when the bump rubber is compressed. Therefore, the outside diameter of the bump plate 5 is usually made larger than the outside diameter of the main body 2 or the inside diameter of the spring seat 7. In assembling the hydraulic damper 1, therefore, the spring seat 7 is first mounted on the main body 2 and then the bump plate assembly 14 is mounted on the bump cap 11.

Figure 4:
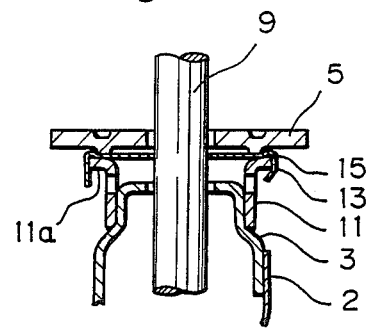
FIGS. 4 and 5 are similar to FIGS. 2 and 3, but showing a second embodiment.
Figure 5:
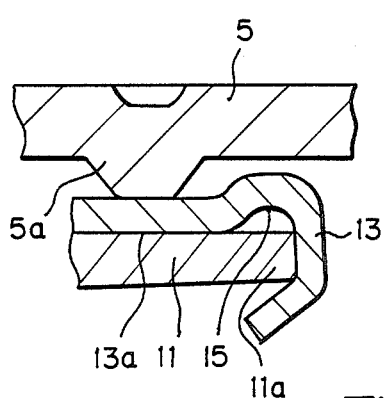

Referring to FIGS. 4 and 5, a second embodiment according to the present invention will now be explained. This embodiment is generally similar to the first embodiment. Corresponding elements are therefore designated by the same reference numerals and explanation thereof will be omitted.

Although the first embodiment has a recess or sunk portion 12 formed on the circumference of the upper surface of the bump cap 11, in this embodiment an annular recess portion 15 instead is formed on the circumference of inner bottom surface 13a of a plate cap 13 and extends around the entire circumference. Therefore, interference between the upper edge portion of bump cap 11 and the bottom corner portion of the plate cap 13 is also eliminated, so that the plate cap 13 can be fitted on and secured to the bump cap 11 in a stable condition in this embodiment also.

Figure 6:
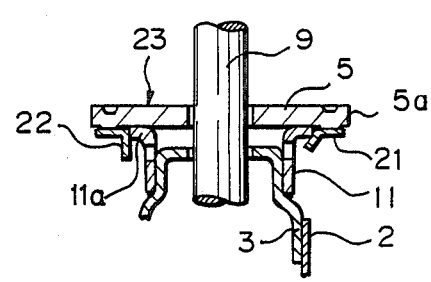
FIGS. 6 and 7 are also similar to FIGS. 2 and 3, but showing a third embodiment.
Figure 7:
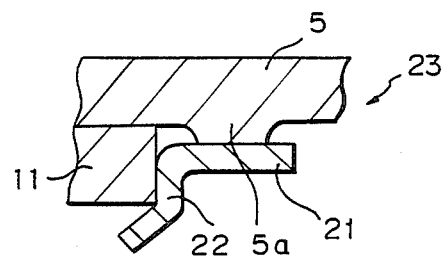
Figure 8:
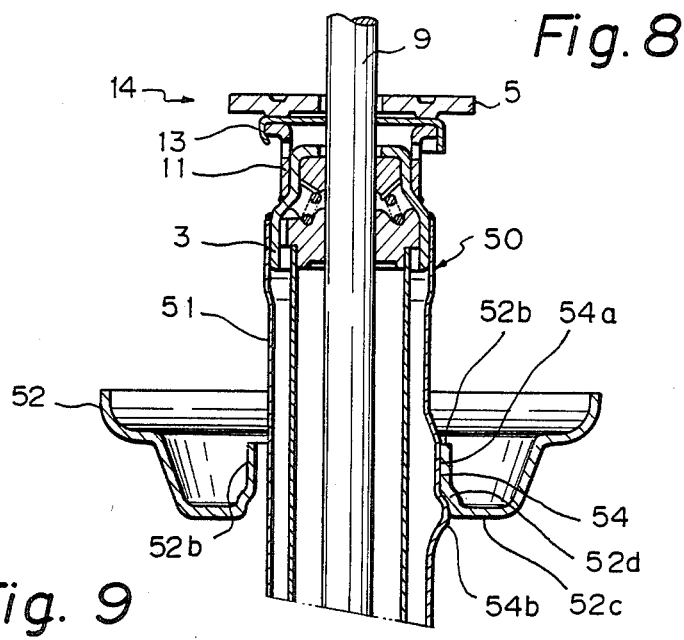
FIG. 8 is similar to FIG. 2, but showing a fourth embodiment.
Figure 9:
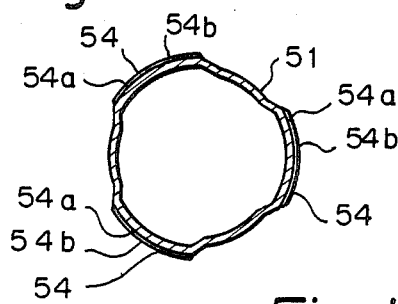
FIG. 9 is a sectional view taken along a line IX—IX shown in FIG. 10.
Figure 10:
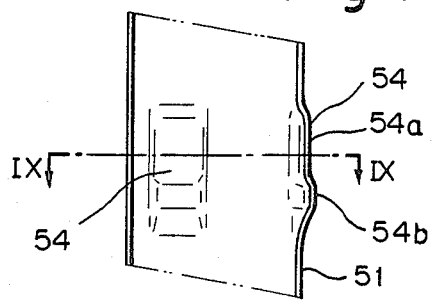
FIG. 10 is an elevational sectional view showing a projecting portion of an main body as shown in FIG. 8.

FIGS. 6 and 7 show a third embodiment of the invention which is also generally similar to the first embodiment. Corresponding elements are therefore again designated by the same reference numerals.

Although in the first and second embodiments the cap-shaped plate cap 13 is fitted on the bump cap 11 from above, another constitution is employed in this embodiment. Namely a plate cap 22 is formed with a tubular shape and has a flange 21 extending radially outwardly. The inside diameter of the plate cap 22 is of such a size that the plate cap 22 may be closely fitted on the outer circumference of a flange 11a of a bump cap 11. The plate cap 22 and a bump plate 5 are integral with each other with small projections 5a being welded to the upper surface of the flange 21 by means of projection welding, thereby constituting a bump plate assembly 23. The plate cap 22 is lightly press-fitted on the flange 11a of the bump cap 11 such that the lower surface of the bump plate 5 is in close contact with the upper surface of the bump cap 11. Then, the lower end portion of the plate cap 22 is radially inwardly deformed in a manner similar to that of the first embodiment. Thus, the bump plate assembly 23 is fixedly secured to the bump cap 11.

As described, in a hydraulic damper according to the invention which is provided with a spring seat mounted on an outer wall of an main body of the damper and a bump plate secured to one end of the main body through a packing cap with a bump cap fixed on the packing cap, a bump stop consisting of the bump cap, a plate cap and the bump plate is secured to the packing cap in such a manner that the plate cap which is integral with the bump plate is fitted on the upper portion of the bump cap and is fixedly hooked to the bump cap by such means as deformation. It is therefore possible to easily and reliably secure the plate cap and bump plate to the bump cap without the need to employ means such as welding after the spring seat has first been mounted on the main body. This results in greatly simplifying and facilitating the assembly of the damper and also in reliably preventing the plate cap and bump plate from becoming disengaged from the bump cap.

Referring to FIGS. 8 to 11, a fourth embodiment of the invention will now be explained.

Figure 1:
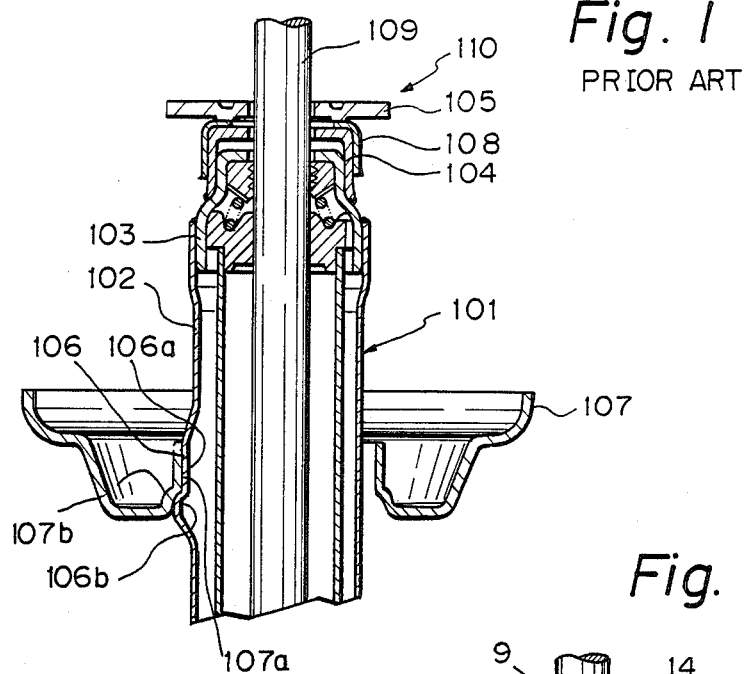
FIG. 1 is a partially broken sectional view showing a prior art hydraulic damper.

In the first to third embodiments described above, the spring seat 7 is mounted on the projecting portions 6 of the main body 2 in the same manner as in the prior art damper explained above referring to FIG. 1. Therefore, the spring seat 7 is reliably prevented from coming off the main body 2 in the downward direction by second stepped portions 6b of the projecting portions 6, while frictional resistance acting between first stepped portion 6a and inside diameter portion 7a acts to prevent the spring seat 7 from coming off the main body 2 in the upward direction. This frictional resistance is not necessarily sufficient for completely preventing the spring seat 7 from coming off the main body 2. Therefore, it is possible that the spring seat 7 may come off the main body 2 due to vibration or shock to which the damper may be subjected during transportation thereof.

According to the present embodiment, a hydraulic damper is provided in which the problems mentioned above are also solved.

Figure 11:
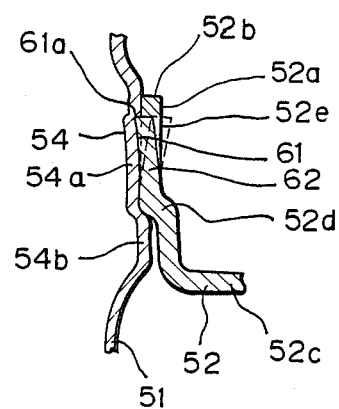
FIG. 11 is a sectional view showing a main portion of the arrangement shown in FIG. 8.

As shown in FIGS. 8 to 11, a tube or main body 51 of a hydraulic damper 50 is provided with three projecting portions 54 formed thereon and equally spaced from each other in the circumferential direction. Each projecting portion 54 consists of a first stepped portion 54a and a second stepped portion 54b. As best shown in FIG. 11, a groove 61 that is generally V-shaped in cross section is formed in the first stepped portion 54a and extends circumferentially of the main body 51.

On the other hand, a spring seat 52 is generally similar to that employed in the first embodiment. The spring seat 52 is formed in a cup shape and is provided with a tubular portion 52b extending from a bottom 52c thereof. In an upper portion 52a of the tubular portion 52b, three hooks 62 are formed in circumferentially equally spaced apart, relation by slitting the tubular portion 52b, the ends of hooks 62 being integrally connected to the tubular portion 52b. Namely, a connected slit is formed and extended on the right and left sides and the upper side of the hook 62 and the upper edge and the right and left edges are separated from the upper portion 52a. As described hereinafter, the upper edge of each hook is adapted to be located at the same position in terms of height as that of the groove. 61 and to engage with the groove 61.

An explanation of the way in which the spring seat 52 is mounted on the main body 51 will now be given. Firstly, the hooks 62 are bent slightly radially inwardly. Next, the spring seat 52 is placed on the main body 51 with the hooks 62 circumferentially aligned with respective grooves 61 of the projecting portions 54( so that a lower stepped portion 52d is engaged with the second stepped portions 54b. In fitting the spring seat 52 to the main body 51, the hooks 62 are first pressed outwardly by the respective first stepped portions 54a, as shown by broken lines in FIG. 11, and then come into engagement with the respective grooves 61 when the lower stepped portion 52d of the spring seat is engaged with the second stepped portions 54b of the main body.

In this condition, the spring seat is prevented from being displaced downwardly with respect to the main body 51 (as viewed in FIG. 8) since the second stepped portions 54b are engaged with the lower stepped portion 52d, and is also prevented from being displaced upwardly since the upper ends of the hooks 62 are engaged with the respective stepped portions 61a of the grooves 61. Thus, the spring seat 52 is reliably fixed on the projecting portions 54 of the main body 51 and is prevented from coming off the projecting portions 54. In this embodiment, it is only necessary to fit the spring seat 52 on the main body in order to reliably fix the spring seat 52 to the main body 51, thereby enabling a quite efficient assembly operation.

Figure 12:
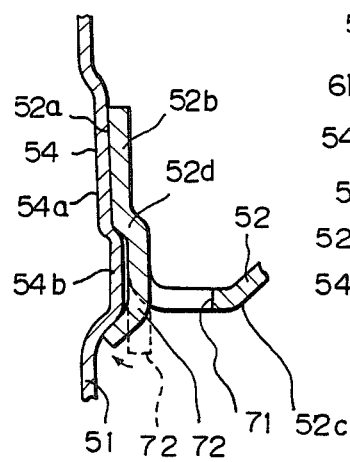
FIGS. 12 to 15 are similar to FIG. 11, but showing fifth to eighth embodiments, respectively.

FIG. 12 shows a fifth embodiment of the invention. This embodiment is generally similar to the fourth embodiment and corresponding elements are designated by the same reference numerals. A plurality of hooks 72 are formed by slitting a bottom portion 52c of a spring seat 52 in a manner similar to that employed in the fourth embodiment. The hooks are formed to extend downwardly from a tubular portion 52b as shown by broken lines 72 in FIG. 12. The spring seat 52 is fitted to the main body 51 so that a lower stepped portion 52d of the tubular portion 52b engages with second stepped portions 54b of the main body 51. Then, the lower end portions of the hooks 72 are bent radially inwardly to come into contact with the lower surfaces of the respective second stepped portions 54b.

Figure 13:
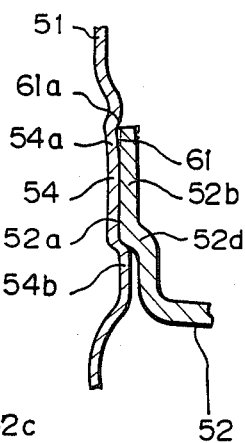

FIG. 13 shows a sixth embodiment of the invention which is also generally similar to the fourth embodiment. Grooves 61 which are the same as those in the fourth embodiment are formed in projecting portions 54 of a main body 51. A spring seat 52 is fitted on the main body 51 so that a lower stepped portion 52d of a tubular portion 52b of the spring seat 52 engages with second stepped portions 54b formed on the respective projecting portions 54. Then, the upper end of the tubular portion 52b is deformed inwardly to engage with the grooves 61. Thus( the spring seat 52 is fixedly secured to the main body 51 and is reliably prevented from coming off the same.

Figure 14:
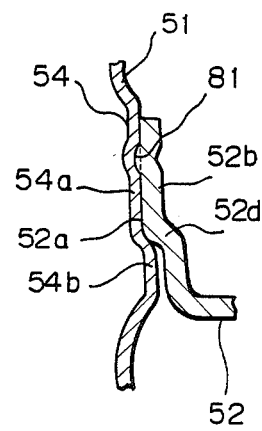

FIG. 14 shows a seventh embodiment of the present invention which is also generally similar to the fourth embodiment. In this embodiment, projecting portions 54 formed on a main body 51 are provided with respective grooves 81 extending in the circumferential direction. In assembly, inner diameter portion 52a of a spring seat 52 is fitted on first stepped portions 54a of the main body 51 and a lower stepped portion 52d of a tubular portion 52b of the spring seat 52 is engaged with second stepped portions 54b of the main body 51. Then, the tubular portion 52b is radially inwardly deformed at position facing the grooves 81 so as to engage with the same. Thus, the spring seat 52 can be prevented from coming off the main body 51.

Figure 15:
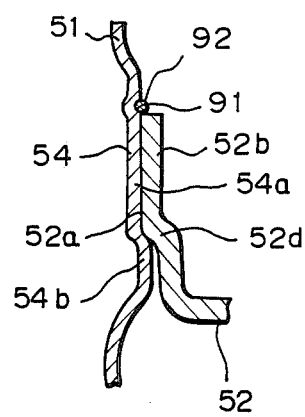
Figure 16:
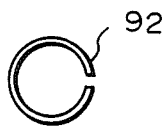
FIG. 16 is a plan view of a stop ring as shown in FIG. 15.

FIG. 15 shows an eighth embodiment of the present invention. This embodiment is also generally similar to the fourth embodiment and corresponding elements are designated by the same reference numerals. In this embodiment, projecting portions 54 formed on a main body 51 are provided with respective grooves 91 of semicircular cross-sectional shape formed on the upper portion of first stepped portions 54a of the projecting portions 54, and grooves 91 extend in the circumferential direction and are axially aligned with each other. In assembly, an inside diameter portion 52a of a spring seat 52 is first fitted on the first stepped portions 54a of the main body 51 and a lower stepped portion 52d of a tubular portion 52b of the spring seat 52 is engaged with second stepped portions 54b of the main body 51. Then, a stop ring 92 is fitted on the main body 51 so as to engage with the grooves 91. Since the upper end of the tubular portion 52b is engaged with the stop ring 91, the spring seat 52 is prevented from coming off the main body 51.

What is claimed is:

1. A hydraulic damper for use in a suspension device of a vehicle such as an automobile including a chassis having a bump rubber intended to bump against said damper upon contraction thereof, said damper comprising:

a main body forming a cylinder;
   a packing cap fitted on and fixedly secured to one end of said main body;
   a piston rod connected to a piston movably received in said cylinder and extending through said packing cap to the outside of said cylinder;
   a spring seat for receiving and supporting one end of a suspension spring, said spring seat having a tubular portion fitted on the outer periphery of said main body;
   stop means for preventing said spring seat from being displaced axially of said main body;
   a bump stop mounted on said packing cap for abutment with the bump rubber of the chassis of the vehicle upon contraction of said damper, said bump stop comprising a bump cap fitted on and fixedly secured to said packing cap, and a bump plate assembly including a bump plate for directly abutting the bump rubber and a plate cap integrally connected to said bump plate;
   said bump plate having an outer diameter that is larger than the inner diameter of said tubular portion of said spring seat;
   said bump cap including a tubular portion and a flange that extends radially outwardly from an upper end of said tubular portion, and said plate cap including a tubular portion sized to receive therein said flange of said bump cap; and
   means for connecting said plate cap to said bump cap in a manner to prevent unintentional disengagement therefrom, said connecting means comprising lower portions of said tubular portion of said plate cap being deformed radially inwardly and hooked over said flange of said bump cap.

2. A damper as claimed in claim 1, wherein said plate cap further includes a top wall closing said upper end of said tubular portion of said bump cap, said bump plate is integrally secured to the upper surface of said top wall, and the lower surface of said top wall contacts the upper surface of said flange of said bump cap to cooperate with said deformed portions of said plate cap to pinch said flange therebetween.

3. A damper as claimed in claim 2, wherein said flange of said bump cap is provided with an annular recess formed in the periphery of said upper surface thereof.

4. A damper as claimed in claim 2, wherein said plate cap is provided with an annular recess formed in the periphery of the inner surface of said top wall thereof.

5. A damper as claimed in claim 1, wherein said plate cap further includes a flange that extends radially outwardly from the upper end of said tubular portion thereof, said bump plate is integrally secured to the upper surface of said flange of said plate cap and contacts the upper surface of said flange of said bump cap to cooperate with said deformed portions of said plate cap to pinch said flange of said bump cap therebetween.

6. A damper as claimed in claim 1, wherein said portions of said plate cap comprising said connecting means are spaced from each other annularly of said plate cap.

7. A damper as claimed in claim 1, wherein said stop means includes a projecting portion formed on the outer periphery of said main body and a portion of said tubular portion of said spring seat engaged with said projecting portion, thereby preventing said spring seat from moving relative to said main body in a first axial direction away from said one end thereof.

8. A damper as claimed in claim 7, wherein said stop means further includes a groove formed in said outer periphery of said main body at a position axially spaced from said projecting portion, and a hook portion provided on said tubular portion of said spring seat and engaging in said groove, said groove and hook portion being so located that the engagement therebetween prevents said spring seat from moving relative to said main body in a second axial direction toward said one end thereof.

9. A damper as claimed in claim 7, wherein said stop means further includes a hook portion formed on said spring seat and engaging with a side of said projecting portion of said main body opposite the side thereof engaged by said portion of said tubular portion of said spring seat.

10. A damper as claimed in claim 7, wherein said stop means further includes a recess formed in said outer periphery of said main body position axially spaced from said projecting portion, and a ridge formed on said tubular portion of said spring seat and received in said recess, thus preventing said spring seat from moving relative to said main body in a second axial direction toward said one end thereof.

11. A damper as claimed in claim 7, wherein said stop means further includes an annular recess formed in said outer periphery of said main body at a position axially spaced from said projecting portion, a stop ring received in said recess, and a hook portion provided on said tubular portion of said spring seat and engaged with said stop ring, said stop ring and said hook portion being located such that the engagement therebetween prevents said spring seat from moving in a second axial direction toward said one end of said main body.

* * * * *